Patented Nov. 15, 1927

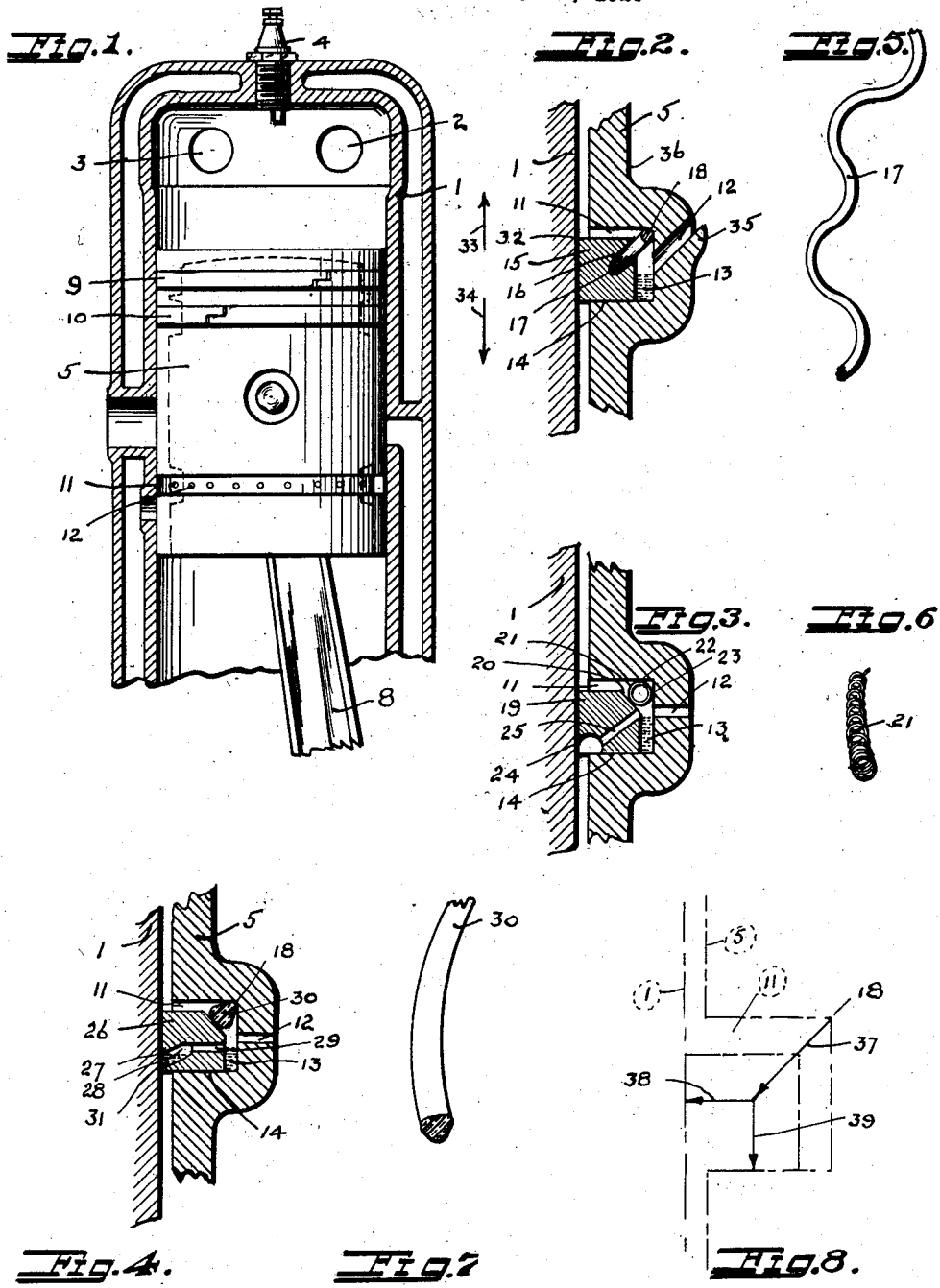
Nov. 15, 1927.
C. F. JOHNSTON ET AL
1,649,474
PISTON RING
Filed Dec. 21, 1925
INVENTORS.
Charles F. Johnston & George G. Rees.
BY George J. Henry
ATTORNEY.

1,649,474

UNITED STATES PATENT OFFICE.

CHARLES F. JOHNSTON AND GEORGE G. REES, OF SAN FRANCISCO CALIFORNIA.

PISTON RING.

Application filed December 21, 1925. Serial No. 76,655.

The object of our invention is a piston ring employing special structural details whereby leakage between the piston and cylinder is avoided, most efficient lubrication is attained and a simple and reliable mechanical construction secured whereby the cost of production, efficiency in service and long life of the ring piston and cylinder is attained.

These objects are accomplished by forming the ring to receive a pressure which may be resolved into two components, one of these components being to expand the ring against the cylinder wall and the other component to retain the ring in contact with one of the piston groove faces, and in combination with the said ring an elastic element which establishes the said pressure substantially about the inner portions of said ring, the said elastic element being normally in compression between the piston groove and the ring, and seating substantially within the corner of said groove.

There may also be formed in the ring periphery a scraping groove in which a reservoir of oil may be retained with a surplus of scraped oil passing back through the piston walls into a conventional oil sump or receiving chamber where it may again be re-used.

Where this feature of our invention is employed we provide an opening through the piston wall from the piston groove and position these above the bottom of the groove so that there is an oil trap or reservoir retained at all times between the inner ring wall and the back wall of the piston groove which trap or reservoir overflows through the said piston parts.

By referring to the accompanying drawing our invention will be made clear.

Fig. 1 illustrates a conventional cylinder in section having a piston therein shown in full view.

Fig. 2 is an enlarged fragmentary section through a portion of the piston and a portion of the cylinder wall and showing a ring and employing one form of our invention.

Fig. 3 is similar to Fig. 2 but showing a variation in the elastic-member-receiving-surface of the ring and showing one form of oil scraping groove.

Fig. 4 is similar to Fig. 3 but showing a variation in scraping groove whereby an oil reservoir is provided in the ring.

Figs. 2, 3 and 4 illustrate a preferred form of oil trap or reservoir between the piston groove and the ring and the manner in which this is retained by appropriately positioning the oil ports through the piston wall.

Figs. 5, 6 and 7 illustrate forms of elastic members in perspective to expand the ring against the cylinder and retain its contact with the lower face of the piston groove.

Fig. 8 is a diagram of forces to illustrate the manner in which the components for expansion and contact between the piston groove and ring are retained by employing our invention.

In Figs. 2, 3, 4 and 8, the spaces between the piston and cylinder walls and between the ring and piston groove are greatly exaggerated for the purpose of more clearly showing the inventive steps.

Throughout the figures similar numerals refer to identical parts.

A conventional cylinder is indicated by the numeral 1, having inlet and outlet ports at 2, 3 respectively and a firing means or spark plug at 4, a piston at 5, and connecting rod at 8.

The piston is provided with packing rings 9, 10, in place, and at 11 a groove for receiving an oiling or scraping ring.

In the bottom or back wall of the groove for receiving our ring we prefer to introduce a plurality of ports or passages 12, and these it will be noted, are positioned at or above the center of the groove whereby a pocket is formed in which oil as at 13, is at all times retained between the ring and the bottom of the piston groove. This insures a supply for an oil film to be retained between the lower ring surface and the lower face of the groove at 14 at all times, and this film serves the double purpose of insuring a closure against leakage, which would otherwise occur through the groove and around the ring and a lubrication between the surfaces of the ring and the groove, under the action of the pressure from the compressed elastic element more fully described below.

The ring shown in cross section at 15 of Fig. 2 is provided with an annular groove 16 cut from the inner upper edge diagonally towards the center of the ring so that the two faces of the groove 16 are in effect segments of conical surfaces.

An elastic element 17 formed of a piece of spring wire bent sinuously is interposed between the corner 18 of the said groove 11 and the bottom of the recess 16, and the sinuosities of the element 17 form a plurality of springs or elastic members in compression about the periphery of the ring and these sinuosities exert a pressure having a direction through the upper corner of the groove at 18 and substantially through the center of the ring section forcing the ring outward and against the cylinder wall 1, and downward against groove surface and the oil film at 14.

The ring shown in cross section at 19 of Fig. 3 is provided with a chamfered face 20 along its inner, upper edge against which the elastic member 21 is compressed between the lines of contact 22, 23 of the upper and inner portions of the groove 11.

The elastic element 21 therefore exerts an outward pressure retaining the ring 19 at all times in close rubbing contact with the cylinder wall 1 and a downward pressure against the oil film at 14.

At 24 is a scraping edge adapted on the down stroke to scrape superfluous oil from the cylinder wall which now passes through a plurality of holes 25 flowing into the oil reservoir 13 and retaining an oil storage therein at all times, the superfluous oil passing off through the holes 12 and thence through the piston wall.

The ring section shown at 26, Fig. 4 is similar to that of 19, Fig. 3 except that the scraping edge at 27 is provided by forming an upward directed groove 28, and oil ports 29 and a solid expansion member 30. This form has the advantage of providing a second oil trap or reservoir at 31 between the lower upward directed surface of the groove 28 and the piston wall 1, so that oil which may be scraped from one portion of the cylinder surface 1 is first stored in a body at 31 adjacent and in contact with the cylinder wall 1, the superfluous oil passing through the port 29 and retaining the primary oil reservoir at 13 and the superfluous oil passing through the piston walls by the ports 12 as before.

Three forms of elastic elements are here shown, that of Fig. 5 being similar to that set forth in United States Letters Patent No. 1,411,360, issued on April 4, 1924, to Chas. F. Johnston, and adapted to use in our invention.

The element shown in Fig. 6 is a helical spring in which the compression of the individual coils provides the elastic feature while that shown in 30 is preferably of asbestos, hemp or other elastic and relatively solid material formed as a core, either by weaving, molding or other conventional method.

In the several forms of elastic elements and ring sections here shown, with or without the scraping edges 24 or 27 there is provided the primary oil reservoir at 13 which, if no ports 25, or 29 are provided, is supplied either from oil passing from the interior of the piston outward through the ports 12 or is collected by the upper edge of the ring at 32 as in Fig. 2 and passes between the upper surface of the ring 15 and the upper surface of the groove 11 and is thus gathered as oil storage in the space 13 to supply and maintain the film at 14.

It will now be seen that upon the upstroke in the direction of the arrow 33 of the piston oil may be gathered from the cylinder wall 1, whereas upon the down stroke in the direction of the arrow 34, the said oil storage at 13 may be supplied from the oil splashing from the inside of the piston. In the latter case the splashed oil may with advantage collect upon the ledge 35 as it descends the inner surface 36 of the piston 5, and thus and at all times be furnished through the ports 12, thus providing an adequate supply at 13 to retain the film 14.

It will be understood that various forms of ring surfaces may be employed, without departing from our invention which is particularly directed to the sealing of the ring against the piston wall and against the lower surface of the piston groove by an elastic element in compression seated in the upper corner or between the upper portions of the piston groove as at 18, Fig. 2 and as at 20, 23 of Fig. 3 and this element exerts a diagonal pressure as indicated diagrammatically by the arrow 37 in Fig. 8 and which diagonal pressure is resolved into the two components 38 tending to expand the ring at all times against the piston wall, and 39 tending to at all times retain a closure between the lower face of the ring and the piston groove and the maintenance of an oil sealing and lubricating film at 14 between the lower portion of the piston ring and piston groove.

We claim:

1. In a hollow piston adapted to reciprocate vertically, a groove adapted to receive a piston ring, an inner oil collecting ridge forming an oil trap, ports opening from said trap through the piston wall and into said groove and substantially above the lower face of said groove.

2. In a hollow piston adapted to reciprocate vertically, a groove adapted to receive a piston ring, an inner oil collecting ridge forming an oil trap, ports opening from said trap through the piston wall and into said groove and substantially above the lower face of said groove, in combination with a ring spaced from the inner groove surface and forming between the ring and said inner surface an oil reservoir.

CHARLES F. JOHNSTON.
GEORGE G. REES.